United States Patent
Suzuki

[11] Patent Number: 5,946,312
[45] Date of Patent: Aug. 31, 1999

[54] ATM CELL TRANSFER SYSTEM IN WHICH USE EFFICIENCY OF TRANSMISSION LINE IS IMPROVED

[75] Inventor: Makoto Suzuki, Tokyo, Japan

[73] Assignee: NEC Corporation, Tokyo, Japan

[21] Appl. No.: 08/950,594

[22] Filed: Oct. 15, 1997

[30] Foreign Application Priority Data

Oct. 25, 1996 [JP] Japan ................................. 8-284222

[51] Int. Cl.⁶ ............................ H04L 12/28; H04L 12/56
[52] U.S. Cl. ........................ 370/395; 370/412; 395/877
[58] Field of Search ................................. 370/230, 235, 370/389, 395, 396, 397, 398, 399, 412, 413; 371/30, 37.1; 395/872, 877

[56] References Cited

U.S. PATENT DOCUMENTS

| | | | |
|---|---|---|---|
| 5,189,668 | 2/1993 | Takatori et al. | 370/427 |
| 5,404,354 | 4/1995 | Hayter et al. | 370/230 |
| 5,509,001 | 4/1996 | Tachibana et al. | 370/230 |
| 5,513,191 | 4/1996 | Takechi et al. | 371/37.1 |

FOREIGN PATENT DOCUMENTS

| | | |
|---|---|---|
| 3-55936 | 3/1991 | Japan . |
| 7-58748 | 3/1995 | Japan . |
| 2 272 612 | 5/1994 | United Kingdom . |

OTHER PUBLICATIONS

Halsall, Fred, Data Communications, Computer Networks and Open Systems. Addison–Wesley Pub. Fourth Ed., pp. 585–590, 1996.

*Primary Examiner*—Ajit Patel
*Assistant Examiner*—Bob A. Phunkulh
*Attorney, Agent, or Firm*—Foley & Lardner

[57] ABSTRACT

In an asynchronous transfer mode (ATM) cell transfer apparatus, a valid cell detecting circuit determines whether or not each of ATM cells is valid, based on a specific data of the ATM cell. When it is determined that the ATM cell is not valid, the valid cell detecting circuit discards the ATM cell. On the other hand, when it is determined that the ATM cell is valid, the valid cell detecting circuit writes the ATM cell in a buffer circuit. A read control circuit reads out the ATM cell from the buffer circuit.

7 Claims, 7 Drawing Sheets

ATM CELL TRANSFER SYSTEM IN WHICH USE EFFICIENCY OF TRANSMISSION LINE IS IMPROVED

BACKGROUND OF THE INVENTION

1. Field of the Invention

The present invention relates to an ATM (asynchronous transfer mode) cell transfer apparatus, and more particularly to an ATM cell transfer apparatus which uses, for an upper layer, AAL5 (ATM Adaptation Layer Type5) which is defined by ITU-T Recommendation I.363 or AAL3/4 (ATM Adaptation Layer Type3/4).

2. Description of the Related Art

A conventional ATM communication system has a high-speed transfer function of ATM cells. In addition, the conventional ATM communication system has to quickly eliminate an overload state of a transmission line when the overloaded state or a congestion state is generated on the transmission line, as shown in, for example, Japanese Laid Open Patent Disclosure (JP-A-Heisei 7-58748).

FIG. 1 is a block diagram illustrating an example of the conventional ATM communication system. Referring to FIG. 1, the conventional ATM communication system is composed of a connection attribute table 9, a switch control unit 10, an ATM switch unit 11, a routing table 12, input transmission line accommodating units 13 and 14, output transmission line accommodating units 15 and 16, congestion detecting units 17 and 18, input transmission lines 21 and 22, output transmission lines 23 and 24, and a ATM cell accumulating unit 29.

In this ATM communication system, the ATM cells which arrive through the input transmission lines 21 and 22 are inputted to the ATM switch unit 11 through the input transmission line accommodating units 13 and 14, respectively. The routing table 12 is referred to based on a connection identifier of each of the arriving ATM cells, and the ATM switch unit 11 sends out the ATM cell to the output transmission line 23 or 24 which corresponds to the connection identifiers. However, when the information which indicates that the ATM cell is to be discarded is stored in the routing table 12, the ATM cell is discarded.

In this ATM communication system, when the load becomes heavy so that congestion occurs, congestion generating information is notified to the switch control unit 10 from one of the congestion detecting units 17 and 18 of the output transmission line accommodating units 15 and 16. The switch control unit 10 selects the connection which has lower importance and which elimination of the congestion can be expected, based on information of connection importance which is stored in the connection attribute table 9. Then, the switch control unit 10 regulates traffic to eliminate the congestion by discarding a part or all of the ATM cells or temporarily saving the ATM cells in the ATM cell accumulating unit 29.

FIG. 2 is a diagram illustrating a protocol stack in the ATM communication system which uses, for the upper layer, AAL5 which is defined in ITU-T Recommendation I.363 (published in November, 1993). In the protocol stack, a protocol layer is separated into two layers of an AAL5 layer and an ATM layer. Further, the AAL5 layer is separated into 3 layers of SSCS (Service Specific Convergence Sublayer), CPCS (Common Part Convergence Sublayer), and SAR (Segmentation And Reassembly) from the uppermost layer.

The operation in each layer in a transmission terminal will be first described with reference to FIG. 3. Referring to FIG. 3, in the SSCS layer, header information and trailer information which are defined by the service of the upper layer of AAL5 are added to SSCS SDU (SSCS Service Data Unit) to generate SSCS PDU (SSCS Protocol Data Unit). The SSCS PDU is sent to the CPCS layer. In the CPCS layer, the trailer information for AAL5 such as an error correction code CRC-32 and a code for checking data length which are defined in ITU-T is added to generate CPCS PDU. The CPCS PDU is sent to the SAR layer. In the SAR layer, the data from the CPCS layer is divided in units of 48 bytes to produce ATM cells and is sent to the ATM layer. In the ATM layer, an ATM cell header such as connection identification information is added to the 48-byte data from the SAR layer and is transmitted to a lower layer. In the case that the ATM cell header is added, an AUU bit of the ATM cell header is set to "1" when the data is the last SAR PDU, and the AUU bit is set to 0, otherwise.

At a terminal on the reception side, the above-mentioned operations of the respective layers in the terminal on the transmission side are executed inversely. A transfer error detecting mechanism such as an error detection code is embedded in each layer and the terminal on the reception side is constructed in such a manner that it is possible to detect an error in the lower layer. For example, when one of the ATM cells is discarded while the ATM cells are transferred, the data is processed just as it is in the ATM layer and the SAR layer. However, a part of CPCS PDU which is produced in the terminal on the reception side is missing so that the data length check error and the CRC-32 error are detected in the CPCS layer. Because the data of the discarded ATM cell can not be generally restored, the CPCS PDU is discarded and then a transmission request is sent to the transmission side once again to recover communication.

In the conventional ATM communication system, the use efficiency of the transmission line is low when AAL5 is used for the upper layer. The reason is that when any ATM cell for which AAL5 is used has been discarded in the ATM switch unit, all the other ATM cells which form the AAL5 SAR SDU are transmitted to the terminal on the reception side nevertheless, even though this AAL5 SAR SDU is discarded in the upper layer in the reception terminal since an ATM cell is missing. This transfer of unuseful ATM cells has the possibility to cause a congestion state in the switch unit or on the transmission line at the following stage.

SUMMARY OF THE INVENTION

The present invention is made in the view of the above-mentioned circumstances.

An object of the present invention is to provide a method of transferring ATM cells in which the use efficiency of a transmission line between the transmission side and the reception side can be increased and an ATM cell transfer apparatus.

Another object of the present invention is to provide a method of transferring ATM cells in which AAL5 or AAL3/4 is used in an upper layer.

In order to achieve an aspect of the present invention, an asynchronous transfer mode (ATM) cell transfer apparatus, includes a cell buffer circuit, a valid cell detecting circuit for determining whether or not each of ATM cells is valid, based on a specific data of the ATM cell, for discarding the ATM cell when it is determined that the ATM cell is not valid, and for writing the ATM cell in the cell buffer circuit when it is determined that the ATM cell is valid, and a read control circuit for reading out the ATM cell from the cell buffer circuit.

The cell buffer circuit may generate a buffer full signal when the cell buffer circuit is full. In this case, the valid cell detecting circuit discards the ATM cell in response to the buffer full signal, and discards the ATM cells subsequent to the discarded ATM cell based on the specific data of each of the subsequent ATM cells. However, the valid cell detecting circuit determines that the ATM cell is valid when the ATM cell is a last one of a series of ATM cells and when the buffer full signal is not present, even if the ATM cells prior to the last ATM cell are discarded.

Alternatively, the valid cell detecting circuit determines that the ATM cell is not valid when one of a series of ATM cells prior to the ATM cell is discarded and when the ATM cell includes the specific data. When the cell buffer circuit generates the buffer full signal, the valid cell detecting circuit discards the ATM cell in response to the buffer full signal. The valid cell detecting circuit determines that the ATM cell is valid when the buffer full signal is present, even if the ATM cell is a last one of the series of ATM cells, The specific data is a bit data contained in a header of the ATM cell. In this case, the ATM cells are produced by dividing data to which ALL5 is used in an upper layer of a transmission source. Instead, the specific data is a bit data contained in a header of the ATM cell and an identifier for identifying a series of ATM cells. In this case, the ATM cells are produced by dividing data to which ALL3/4 is used in an upper layer of a transmission source.

In order to achieve another aspect of the present invention, an asynchronous transfer mode (ATM) cell transfer apparatus, includes a plurality of reception units, each of which includes a cell buffer circuit and selectively stores each of ATM cells based on a specific data of the ATM cell, and a read control circuit for reading out the ATM cells from the cell buffer circuit of each of the plurality of reception units to output onto a single transmission output line.

Each of the plurality of reception units is provided for a transmission input line from a transmission source. Each of the plurality of reception units includes the cell buffer circuit and a valid cell detecting circuit.

In this case, the read control circuit reads out the ATM cells from the cell buffer circuits of the plurality of reception units in response to the write signals, respectively, the read out ATM cells being multiplexed and outputted onto the single transmission output line.

In order to achieve still another aspect of the present invention, a method of transfer asynchronous transfer mode (ATM) cells, includes the steps:
determining whether or not each of ATM cells is valid, based on a specific data of the ATM cell;
discarding the ATM cell when it is determined that the ATM cell is not valid;
generating a write signal when it is determined that the ATM cell is valid;
writing the ATM cell in a cell buffer circuit when it is determined that the ATM cell is valid; and
reading out the ATM cell from the cell buffer circuit in response to the write signal.

DESCRIPTION OF THE PREFERRED EMBODIMENTS

Next, an ATM cell transfer apparatus of the resent invention will be described below in detail with reference to the attached drawings.

Figure 1:
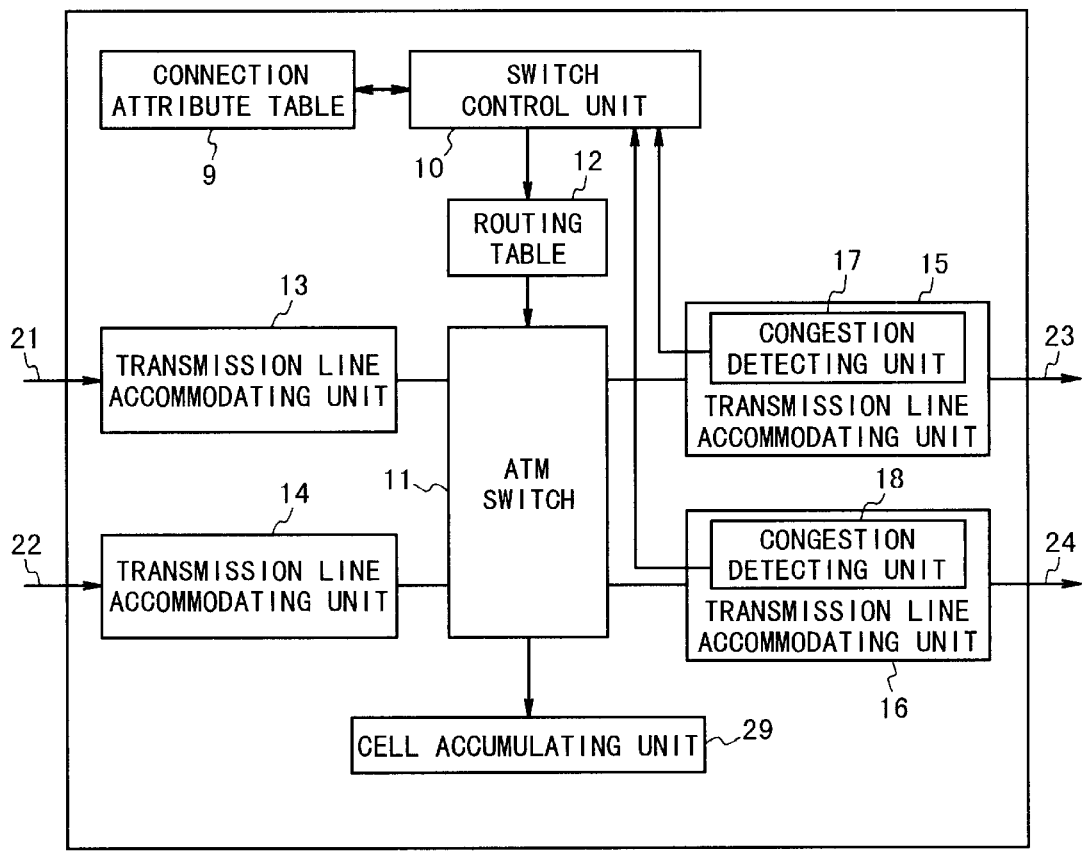
FIG. 1 is a block diagram illustrating the structure of a conventional AAL5 ATM communication system.
Figure 2:
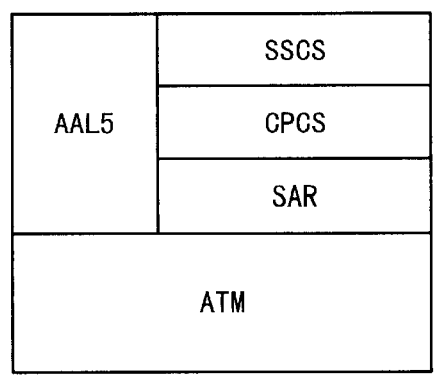
FIG. 2 is a diagram of a protocol stack of an AAL5 layer and an ATM layer which are defined in ITU-T Recommendation I.363.
Figure 3:
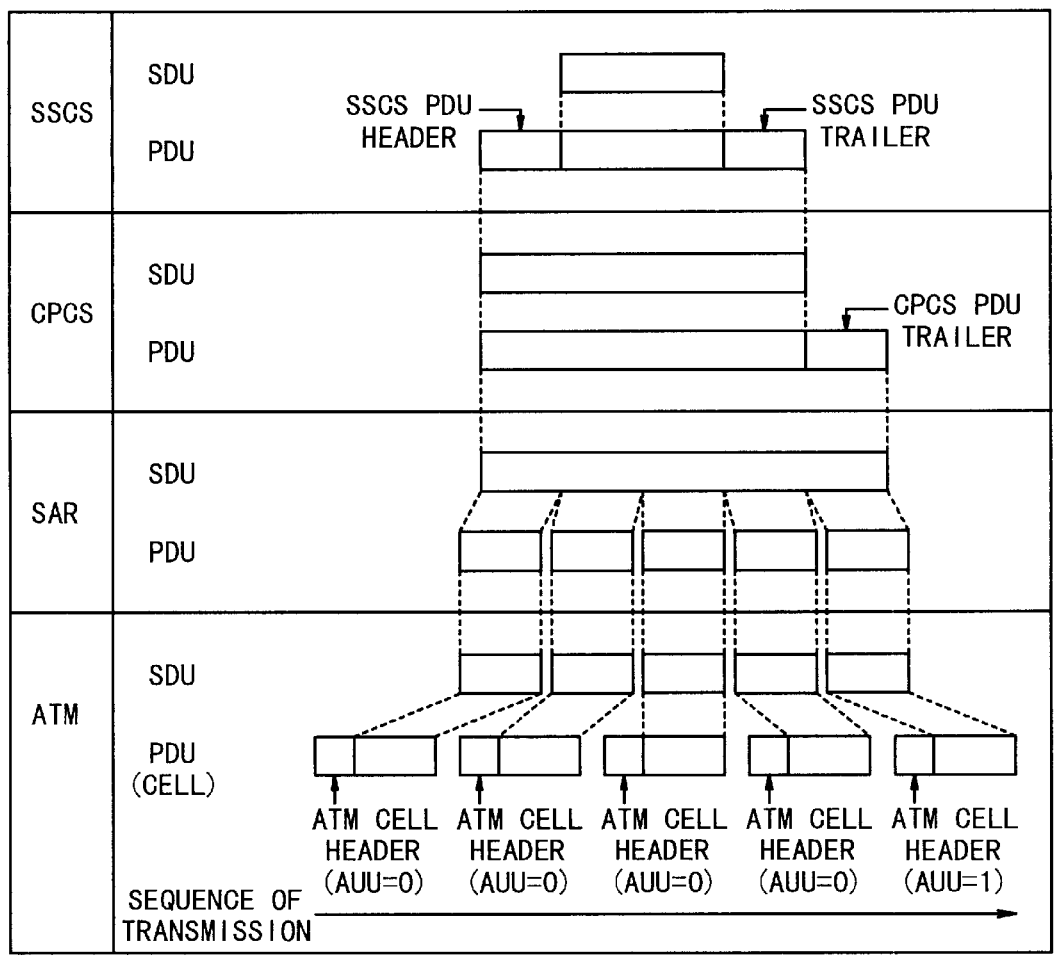
FIG. 3 is a concept diagram illustrating a method of processing data in each layer in an ALL5 ATM communication system which uses the AAL5 layer as an upper layer.
Figure 4:
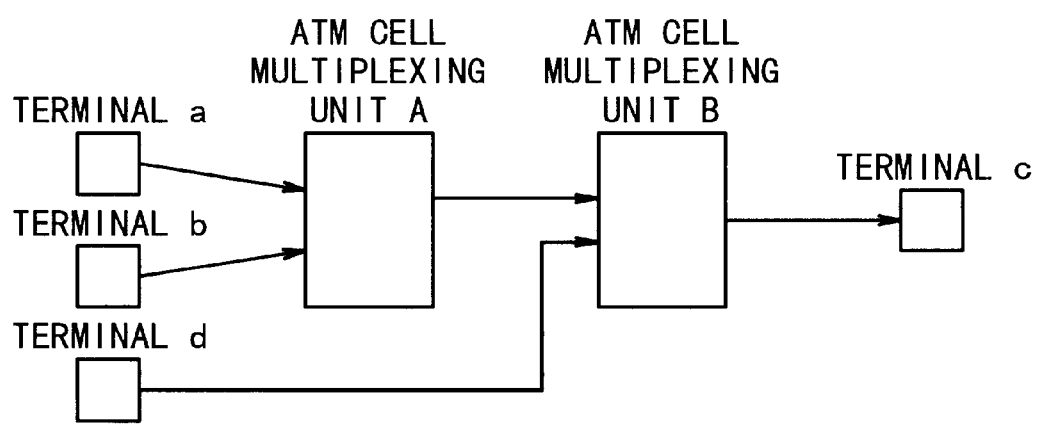
FIG. 4 is a block diagram illustrating an ATM cell transfer apparatus according to an embodiment of the present invention.

FIG. 4 shows the structure of the ATM cell transfer apparatus according to an embodiment of the present invention. For instance, the ATM cell transfer apparatus is applied to the ATM switch unit 10 shown in FIG. 1. The ATM cell transfer apparatus is composed of ATM multiplexing units A and B. In the ATM cell transfer apparatus shown in FIG. 4, transmission terminals a and b are supposed to be connected to the ATM cell multiplexing unit A. Then, the ATM multiplexing unit A, a transmission terminal d and a reception terminal c are supposed to be connected to the ATM cell multiplexing unit B. Also, the terminals a, b, c and d are the terminals which communicate using ATM cells which have passed through a layer using AAL5, respectively.

Now, all the terminals a, b and d are supposed to be on communication with terminal c. At this time, information (AAL5 SAR SDU) which is to be transmitted from each of the terminals a and b has been divided into ATM cells. Then, the ATM cells are multiplexed by the ATM cell multiplexing unit A and are supplied to the ATM cell multiplexing unit B. In this example, the multiplexing unit A multiplexes the ATM cells from the two terminals. However, the number of terminals is not limited to two and may be more than two. The ATM cell multiplexing unit B multiplexes the multiplexed ATM cells and AAL5 ATM cells from the terminal d and outputs the multiplexing result to the terminal c. In the terminal c, the AAL5 SAR SDU is assembled based on the received ATM cells for every connection identifier and further is sent to the upper layer.

Figure 5:
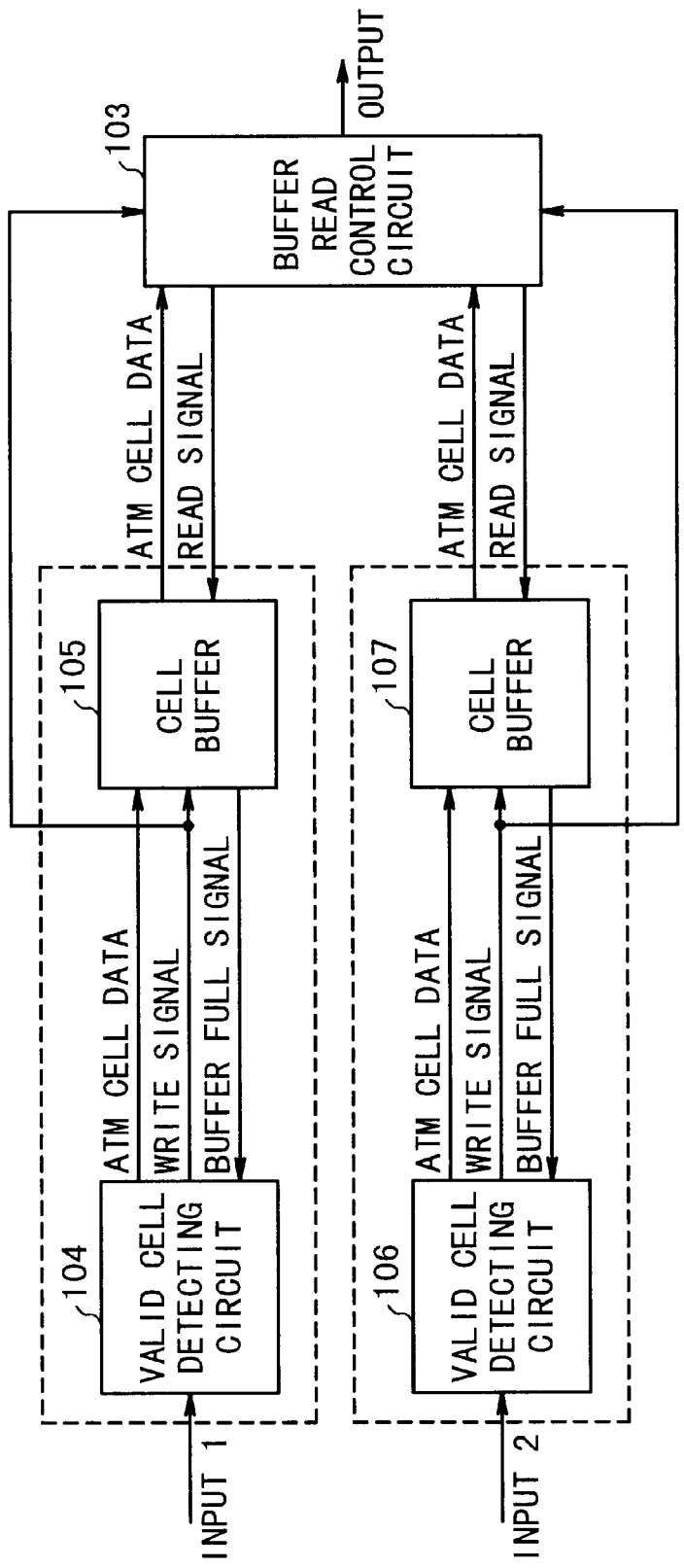
FIG. 5 is a block diagram illustrating the structure of an ATM cell multiplexing unit in the ATM cell transfer apparatus shown in FIG. 4.

FIG. 5 shows the structure of the ATM cell multiplexing unit A or B. The ATM cell multiplexing unit of FIG. 5 is composed of valid cell detecting circuits 104 and 106 respectively connected to inputs 1 and 2, cell buffers 105 and 107, and a buffer read control circuit 103. FIFO memories are generally used for the cell buffer 105 and 107, respectively. The valid cell detecting circuit 104 is connected to a transmission input line 1 to output the ATM cell supplied therefrom and a write signal. The cell buffer 105 receives the ATM cell and the write signal from the valid cell detecting circuit 104 and outputs the ATM cell in accordance with a read signal from the buffer read control circuit 103. The valid cell detecting circuit 106 is connected to a transmission input line 2 to output an ATM cell supplied therefrom and a write signal. The cell buffer 107 receives the ATM cell and the write signal from the valid cell detecting circuit 106 and outputs the ATM cell in accordance with a read signal from the buffer read control circuit 103. The buffer read control circuit 103 receives the write signals from the valid cell detecting circuits 104 and 106 to generate and output the read signals to the cell buffers 105 and 107. The buffer read control circuit 103 reads and outputs the ATM cell from the cell buffers 105 and 107 to a transmission output line.

Figure 6:
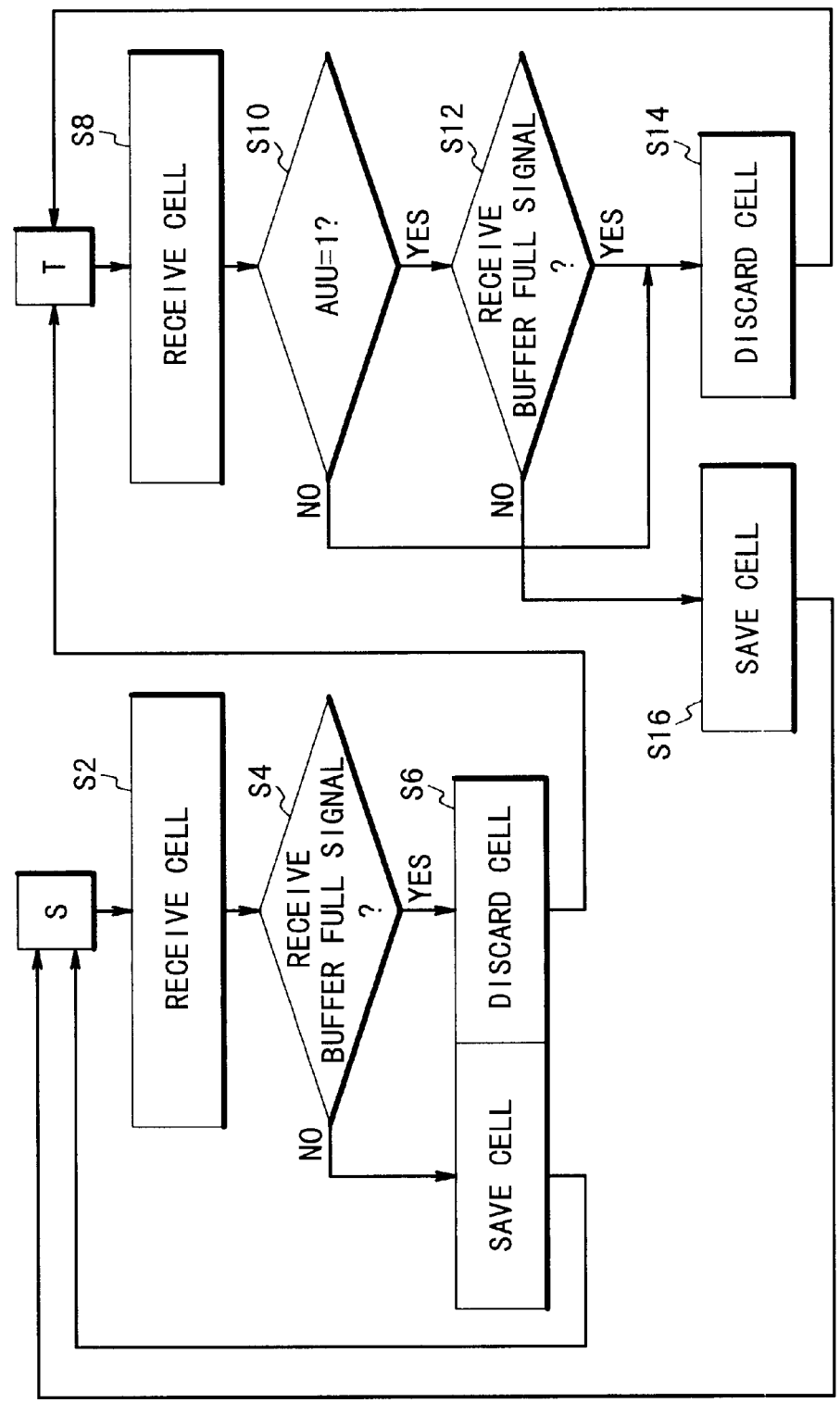
FIG. 6 is an operation flow chart of a valid cell detecting circuit shown in FIG. 5.
Figure 7:
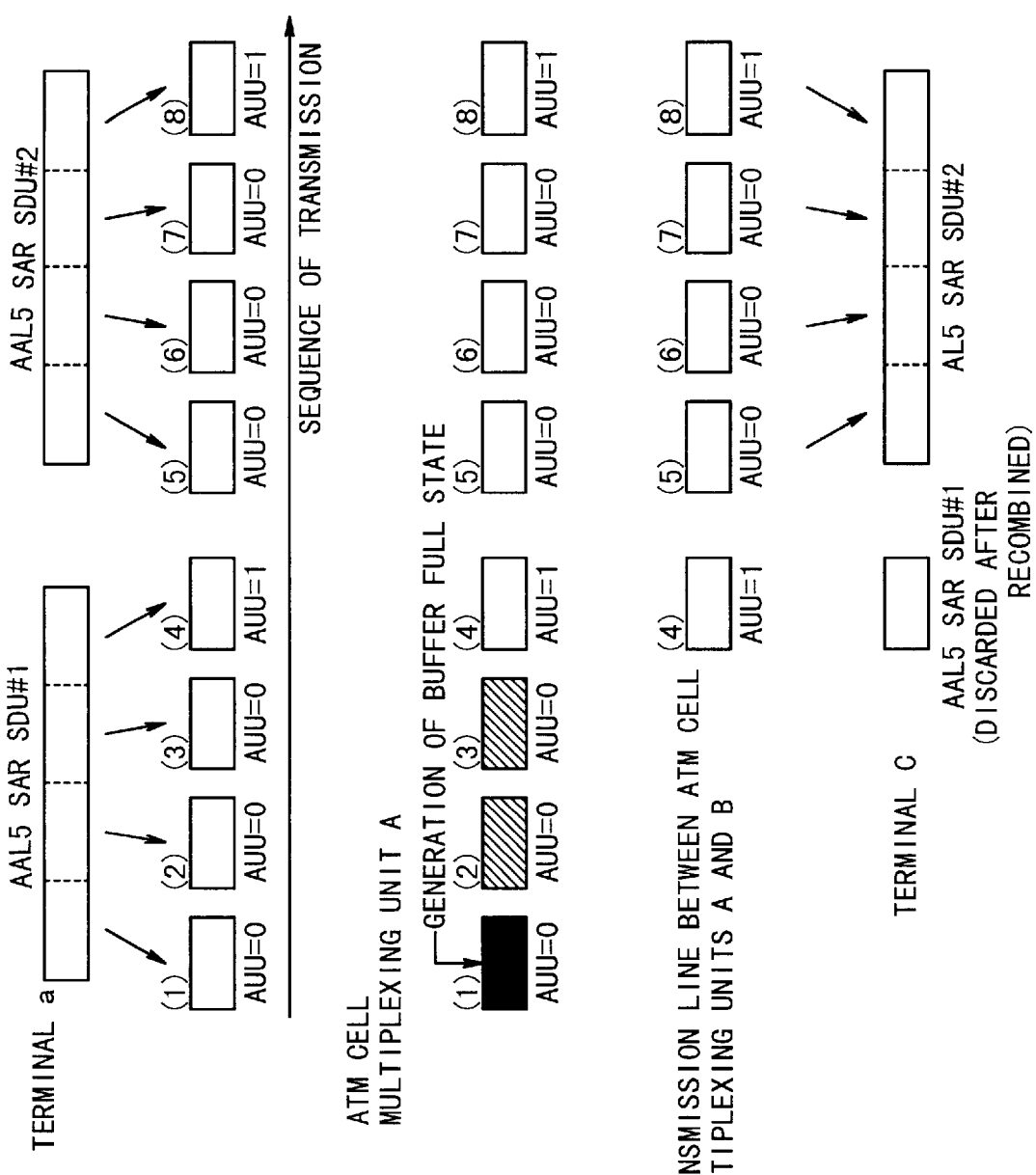
FIGS. 7A to 7E are diagrams illustrating the ATM cell transfer operation when an ATM cell is discarded in the ATM cell transfer apparatus A shown FIG. 4.

When one ATM cell of a series of ATM cells is inputted from the transmission input line 1, the valid cell detecting circuit 104 determines whether or not the ATM cell is to be saved in the cell buffer 105 or to be discarded, in accordance with the flow shown in FIG. 6 which is described in detail later. If the ATM cell is to be saved, the valid cell detecting circuit 104 outputs the ATM cell and the write signal. If the ATM cell is to be discarded, the valid cell detecting circuit 104 does not output both of the ATM cell and the write signal.

When the write signal is inputted from the valid cell detecting circuit 104, the cell buffer 105 stores the ATM cell input in the cell buffer. Also, when the read signal is inputted from the buffer read control circuit 103, if any ATM cell is left in the cell buffer, the cell buffer 105 reads the ATM cell in response to the read signal to output to the buffer read control circuit 103. Also, the cell buffer 105 counts the number of ATM cells which are left in the cell buffer 105 without being read. When the count value reaches the same value as the maximum capacity of the cell buffer, the cell buffer 105 outputs a buffer full signal to the valid cell detecting circuit 104.

The operations of the valid cell detecting circuit 106 to the transmission input line 2 and the cell buffer 107 are the same manner as those of the valid cell detecting circuit 104 to the transmission input line 1 and the cell buffer 105, respectively.

The buffer read control circuit 103 monitors the write signal from the valid cell detecting circuit 104 and outputs the read signal to the cell buffer 105 in response to the write signal. Thus, the buffer read control circuit 103 can recognize whether or not any ATM cell is left in the cell buffer 105 without being read. In the same manner, the buffer read control circuit 103 monitors the write signal from the valid cell detecting circuit 106 and outputs the read signal to the cell buffer 107 in response to the write signal. Thus, the buffer read control circuit 103 can recognize whether or not any ATM cell is left in cell buffer 107 without being read.

When ATM cells are left in both of the cell buffers 105 and 107, the buffer read control circuit 103 alternately outputs the read signals to the cell buffers 105 and 107 and reads the ATM cells from the cell buffers 105 and 107 to output to the transmission output line. Also, when the ATM cells are left only in either one of the cell buffers 105 and 107, the buffer read control circuit 103 outputs the read signals to the one cell buffer in which the ATM cells are left and reads the ATM cell from the one cell buffer to the transmission output line. In this case, a band for the other cell buffer can be used for the one cell buffer.

Next, the operation flow of valid cell detecting circuits 104 and 106 will be described. FIG. 6 shows the operation flow. Referring to FIG. 6, the valid cell detecting circuit 104 starts the operation from the initial state (shown by S in figure). In this state S, when one of a series of ATM cells is received in a step S2, there is a room in the cell buffer 105 such that the received ATM cell can be saved in the cell buffer 105. If a cell buffer full signal is not inputted from the cell buffer 105 in a step S4, the ATM cell is outputted to the cell buffer 105 and the write signal is outputted to the cell buffer 105 and the buffer read control circuit 103. The ATM cell is saved in the cell buffer 105 in a step S6. Then, the valid cell detecting circuit 104 returns to the state S again.

At this time, since the cell buffer is full so that the buffer full signal is inputted from the cell buffer 105 to the valid cell detecting circuit 104 in the step S4, the received ATM cell is discarded in the step S6. Then, the valid cell detecting circuit 104 transfers to the state T without outputting the write signal. In the state T, when the next one of the series of ATM cells is received in a step S8, it is determined by the valid cell detecting circuit 104 in a step S10 whether an AUU bit which is in the header of the received ATM cell is set to 0. When it is determined that the AUU bit is set to 0, the ATM cell is discarded in a step S14. Then, the valid cell detecting circuit 104 returns to the state T without outputting the write signal to the cell buffer 105. In the state T, when the ATM cell having the AUU bit of 1 is received in the step S8, the ATM cell is saved in the cell buffer 105, if it is determined in a step S12 that the buffer full signal is not received. Then, the valid cell detecting circuit 104 transfers to the state S.

If it is determined in the step S12 that the buffer full signal is inputted, the ATM cell is discarded in the step s14. Then, the valid cell detecting circuit 104 returns to the state T.

In other words, in the state T, if the ATM cell with the AUU bit of 1 is received and the buffer full signal is not inputted at that time, the ATM cell is saved. Otherwise, the ATM cells continue to be discarded. The above operation is similarly executed to the valid cell detecting circuit 106 and the cell buffer 107.

The operation of the valid cell detecting circuit will be more described with reference to FIGS. 7A to 7E. It is supposed that AAL5 SAR SDU #1 and #2 are sent out from the terminal a shown in FIG. 4. In the terminal a, AAL5 SAR SDU #1 and #2 are divided into ATM cells (1) to (8) which are sent out to the valid cell detecting circuit 104. At this time, the AUU bit is set to 1 in each of the ATM cells (4) and (8) as the last ATM cells of AAL5 SAR SDU #1 and #2. Also, the AUU bit are set to 0 in each of the other ATM cells. At this time, suppose that the congestion state occurred on the output side of the ATM cell multiplexing unit A only when the ATM cell (1) is received by the ATM cell multiplexing unit A, and that the cell buffer 105 is full. In this case, since the valid cell detecting circuit 104 receives the buffer FULL signal from the cell buffer 105, the ATM cell (1) is discarded and the valid cell detecting circuit 104 transits to the state T.

After that, when the ATM cells (2) and (3) are received in the state T, since the AUU bits are set to 0 in both of the ATM cells, the ATM cells are unconditionally discarded. Then, the valid cell detecting circuit 104 is left in the state T. When the ATM cell (4) is received, since the AUU bit is set to 1, the ATM cell is saved in the cell buffer 105. Then, the valid cell detecting circuit 104 returns to the state S.

After that, all the ATM cells (5) to (8) are saved in the cell buffer 105. Accordingly only the ATM cells (4) to (8) are outputted from the ATM cell multiplexing unit A and arrive at the terminal c.

In the reception terminal c, since only the ATM cell (4) to (8) are received, AAL5 SAR SDU #1 is discarded through the error detection by an upper layer, different from the transmission side. AAL5 SAR SDU #2 is normally received and is further transferred for processing in an upper layer.

On the other hand, in the conventional apparatus with the same condition, the ATM cells (2) to (8) are received. However, AAL5 SAR SDU #1 is discarded by the upper layer, like the present invention. AAL5 SAR SDU #2 is transferred for processing in the upper layer as the normal reception.

According to the ATM cell transfer apparatus, while the communication method is identical to the AAL5 SAR SDU communication in quality, the ATM cells (2) and (3) which have been made unuseful when the ATM cell (1) has been already discarded are not outputted onto the transmission output line. In other words, because this free band can be used by the terminals b and d, the use efficiency of the transmission line is improved.

In the ATM cell transfer apparatus using AAL5 for the upper layer, the ATM cells of AAL5 SAR SDU #1 and #2 are supplied for every AAL5 SAR SDU. However, in the ATM cell transfer apparatus using AAL3/4 for the upper layer, the ATM cells are multiplexed between two series of ATM cells and supplied.

Figure 8:
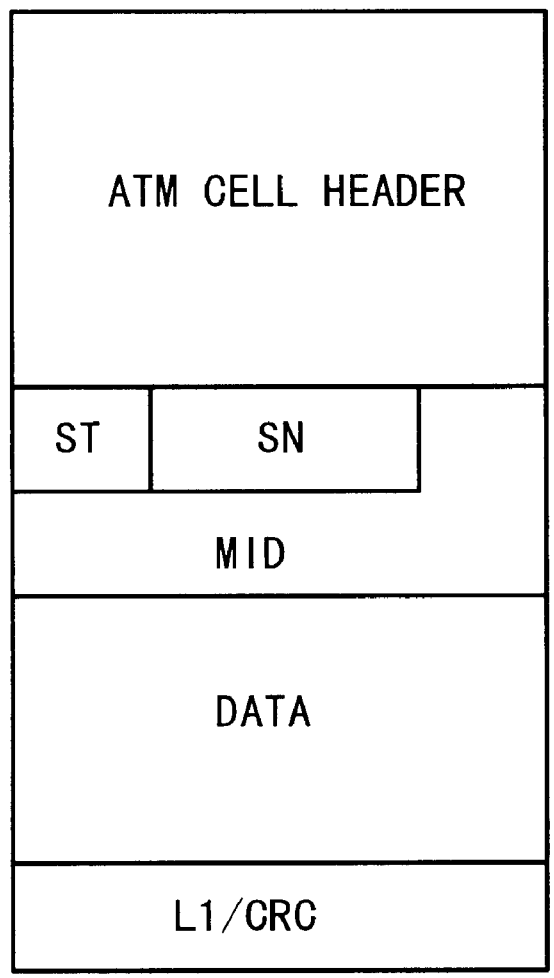
FIG. 8 is a diagram illustrating the the structure of an ATM cell in the ATM cell transfer apparatus in which ALL3/4 is used for an upper layer.

FIG. 8 shows the structure of the ATM cell when AAL3/4 is used. Referring to FIG. 8, the data indicating whether the ATM cell is the last cell is stored in an ST field. Also, the data indicating whether the ATM cell belongs to the same packet or the series of ATM cells, i.e., an identifier, is stored in a MID field. In this example, the valid cell detecting circuit 104 has a register (not shown) for storing the MID field data.

When an ATM cell is discarded, the MID field identifer is stored in the register. When the next ATM cell is received, the valid cell detecting circuit 104 checks whether the identifier of the received ATM cell is the same as the identifier stored in the register. When the both are not coincident, the received ATM cell is saved in the cell buffer, if the discarding of the ATM cells is not performed to the series of the ATM cells to which the received ATM cell belongs.

When the both are coincident, it is checked whether the data of the received ATM cell in the ST field indicates that the received ATM cell is the last cell. When it is determined that the received ATM cell is not the last cell, the received ATM cell is discarded. When it is determined that the received ATM cell is the last cell, the received ATM cell is discarded or saved in the cell buffer based on the generation of the buffer full signal, as shown in the step S12 of FIG. 6.

In this manner, in case of AAL3/4, the present invention can be also applied.

According to the present invention, the use efficiency of the transmission line increases. The reason is that when the ATM cell is discarded in the ATM cell transfer apparatus, the ATM cells subsequent to the discarded ATM cell that belong to the same SAR SDU are also discarded.

What is claimed is:

1. An asynchronous transfer mode (ATM) cell transfer apparatus, comprising:

a buffer circuit;

a valid cell detecting circuit for determining whether or not each of ATM cells is valid, based on a specific data of said ATM cell, for discarding said ATM cell when it is determined that said ATM cell is not valid, and for writing said ATM cell in said buffer circuit when it is determined that said ATM cell is valid; and a read control circuit for reading out said ATM cell from said buffer circuit, wherein said buffer circuit generates a buffer full signal when said buffer circuit is full, and wherein said valid cell detecting circuit discards said ATM cell in response to said buffer full signal, and discards ATM cells subsequent to said discarded ATM cell based on said specific data of each of said subsequent ATM cells.

2. An ATM cell transfer apparatus according to claim 1, wherein said valid cell detecting circuit determines that said ATM cell is valid when said ATM cell is a last one of a series of ATM cells even if the ATM cells prior to said last ATM cell are discarded.

3. An asynchronous transfer mode (ATM) cell transfer apparatus, comprising:

a buffer circuit;

a valid cell detecting circuit for determining whether or not each of ATM cells is valid, based on a specific data of said ATM cell, for discarding said ATM cell when it is determined that said ATM cell is not valid, and for writing said ATM cell in said buffer circuit when it is determined that said ATM cell is valid; and a read control circuit for reading out said ATM cell from said buffer circuit, wherein said valid cell detecting circuit determines that said ATM cell is not valid when one of a series of ATM cells prior to said ATM cell is discarded and when said ATM cell includes said specific data, wherein said buffer circuit generates a buffer full signal when said buffer circuit is full, and wherein said valid cell detecting circuit discards said ATM cell in response to said buffer full signal.

4. An ATM cell transfer apparatus according to claim 3, wherein said valid cell detecting circuit determines that said ATM cell is valid when said ATM cell is a last one of said series of ATM cells and when said buffer full signal is not present, even if the ATM cells prior to the last ATM cell are discarded.

5. An asynchronous transfer mode (ATM) cell transfer apparatus, comprising:

a plurality of reception units, each of which includes a buffer circuit and selectively stores each of ATM cells based on a specific data of said ATM cell; and a read control circuit for reading out said ATM cells from said buffer circuit of each of said plurality of reception units to output onto a single transmission output line, wherein each of said plurality of reception units includes a valid cell detecting circuit for determining whether or not each of ATM cells is valid, based on a specific data of said ATM cell, for discarding said ATM cell when it is determined that said ATM cell is not valid, and for generating a write signal to write said ATM cell in said buffer circuit when it is determined that said ATM cell is valid, wherein said buffer circuit generates a buffer full signal when said buffer circuit is full, wherein said valid cell detecting circuit corresponding to said buffer circuit discards said ATM cell in response to said buffer full signal, and discards the ATM cells of a group subsequent to said discarded ATM cell based on said specific data of each of said subsequent ATM cells, and wherein said valid cell detecting circuit determines that said ATM cell is valid when said ATM cell is a last one of the group of ATM cells and when said buffer full signal is not present, even if the ATM cells prior to said last ATM cell are discarded.

6. A method of transferring asynchronous transfer mode (ATM) cells, comprising the steps of:

determining whether or not each of ATM cells is valid, based on a specific data of said ATM cell;

discarding said ATM cell when it is determined that said ATM cell is not valid;

generating a write signal when it is determined that said ATM cell is valid;

writing said ATM cell in a buffer circuit when it is determined that said ATM cell is valid;

reading out said ATM cell from said buffer circuit in response to said write signal; and generating a buffer full signal from said buffer circuit when said buffer circuit is full, and wherein said determining step includes determining that said ATM cell is not valid, in response to said buffer full signal, and determining that the ATM cells subsequent to said discarded ATM cell are not valid, based on said specific data of each of said subsequent ATM cells.

7. A method according to claim 6, wherein said determining step includes determining that said ATM cell is valid when said ATM cell is a last one of a series of ATM cells regardless of said buffer full signal, and when said buffer full signal is not present, even if the ATM cells prior to said last ATM cell are discarded.

* * * * *